May 22, 1923.
J. N. MORRIS
UNIVERSAL JOINT
Filed May 12, 1922
1,456,329
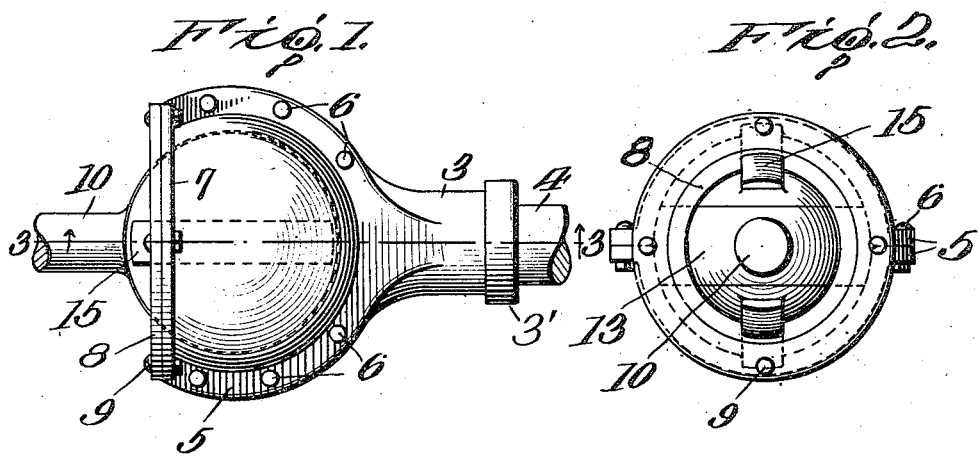
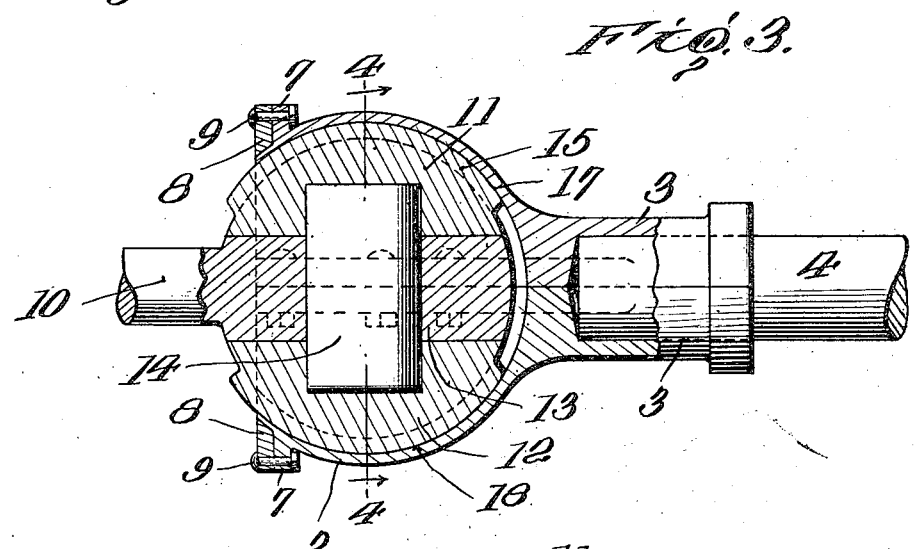
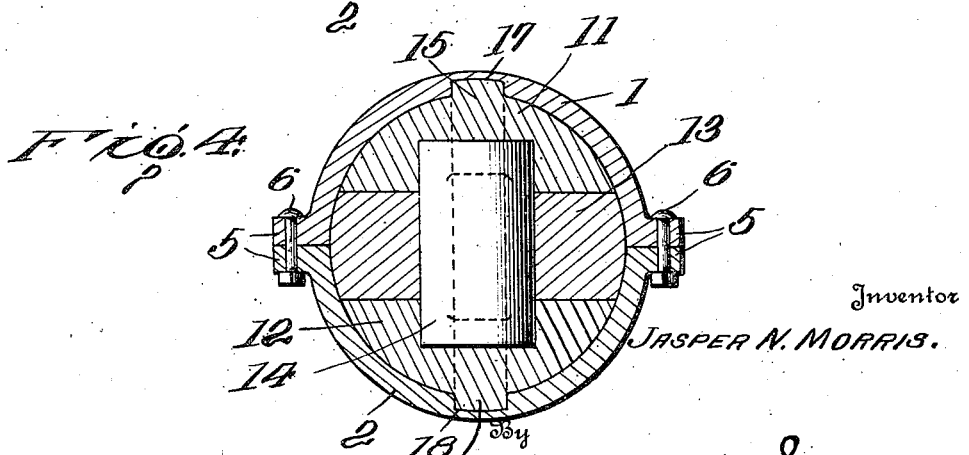
Inventor
JASPER N. MORRIS.
By Sturtevant & Mason Attorneys Patented May 22, 1923.

1,456,329

UNITED STATES PATENT OFFICE.

JASPER N. MORRIS, OF HATTIESBURG, MISSISSIPPI.

UNIVERSAL JOINT.

Application filed May 12, 1922. Serial No. 560,294.

*To all whom it may concern:*

Be it known that I, JASPER N. MORRIS, a citizen of the United States, residing at Hattiesburg, in the county of Forest, State of Mississippi, have invented certain new and useful Improvements in Universal Joints, of which the following is a description, reference being had to the accompanying drawing, and to the figures of reference marked thereon.

This invention relates to universal joints adapted for the transmission of power.

The main object of the present invention is to provide such a universal joint composed of a few simply constructed parts which can be readily and cheaply assembled.

Another object of this invention resides in providing a universal joint composed of a few parts easily assembled and when assembled, making a substantially enclosed joint adapted to exclude dust, dirt and other foreign substances.

Yet a further feature of this invention resides in the novel construction and assembly of the respective sections of the joint so that they will efficiently transmit power from one shaft in a universal manner to another shaft.

These and other objects will be apparent from a perusal of the following specification taken in connection with the accompanying drawings, wherein—

Figure 1 is a side view of the universal joint;

Fig. 2 is an end view thereof looking from the left of Fig. 1;

Fig. 3 is a section on the line 3—3 of Fig. 1, and

Fig. 4 is a section on the line 4—4 of Fig. 3.

Referring now specifically to the drawings, the device comprises an exterior enclosing casing preferably formed of two sections 1 and 2. As shown clearly in the drawings, these two sections, which are preferably castings, form, when united, a substantially hollow hemisphere. Each section has an extended portion 3 threaded on its end, which sections when united, form a sleeve within which fits a shaft 4 constituting a drive or driven shaft as may be desired. A collar 3' threads onto the threaded ends of this two-part extended portion or sleeve to rigidly connect the same to the shaft 4. These upper casings are flanged as at 5 and are provided with registering bolt holes to receive bolts 6 so that they may be held in assembled relation. In a similar manner, the open ends of these casings are flanged as at 7 and provided with bolt holes so that a ring 8 may be bolted thereto, as at 9. This ring 8 as will hereinafter be evident, securely holds the inner spherical member in position and assists in taking up lateral thrusts and other strains.

These outer casings enclose an inner spherical member which forms driving connection with a second shaft 10. In the preferred form of device, this inner spherical member is built up of spherical segments. In the present instance, there are two segments 11 and 12 which are spaced apart by means of an intermediate segment 13, the latter taking the form of a ring or annulus provided with a preferably integral stub herein shown as the shaft 10. Obviously, the shaft 10 may be made detachable thereto in any desired manner, as by threading. The two spaced segments 11 and 12 are provided with bearings for a central pivotal pin 14. Preferably, these bearings are formed by coring out each of the spaced segments 11 and 12 so that the pin snugly fits therein as shown in Fig. 4. The ring or annulus 13 is pivotally mounted on this pin 14 so that it will swing in a single plane between the spaced segments. Means is also provided for restricting the plane of movement of the inner spherical member as a whole in a single plane relatively to the exterior surrounding casings and in a plane substantially at right angles to the plane of movement of the ring or annulus 13. In the present instance, this is accomplished by providing the periphery of each spherical segment 11 and 12 with a peripheral ridge or projection 15, 16, which is adapted to fit snugly but freely in a corresponding groove 17, 18 in the inner face of each of the outer casings 1 and 2. The plane of these ridges and grooves when the joint is assembled, is substantially at right angles to the plane of movement of the annulus 13 as it moves between the two segments 11 and 12. Obviously, other means may be availed of for restricting the relative movement of the outer casings and the inner spherical member about this single plane. It will be seen that by constructing the inner spherical member in the above manner, it is composed of a plurality of segments or sections which can be easily and quickly assembled, each of which is a simple casting, if it be desired to make such sections in that manner. So also, the outer casings comprise members which are easily assembled and can also be made of simple castings.

It is also manifest that when the device is assembled, it is most compact and is a self-contained unit in that the enclosing casings and the ring 8 substantially encloses the multi-sectioned inner member. A further advantage of this self-contained universal joint resides in the ease in which the same can be lubricated and will retain the lubricant therein without contamination from dirt and foreign matter.

It is obvious that minor changes in the details of construction and the arrangement of the parts may be made without departing from the spirit of the invention as set forth in the appended claim.

Having thus described the invention, what I claim as new and desire to secure by Letters Patent, is—

A universal coupling comprising two substantially hemispherical shells adapted to make driving connection with a first shaft and united in a plane parallel with the axis of said shaft, each of said shells having flanger openings, the flanges of which lie at right angles to the plane of connection of said sections, whereby said shells when united form an open-ended hollow sphere, a substantially spherical multi-sectional inner member housed in said joined sections and bodily shiftable relative thereto in a plane parallel with the axis of said shaft, means for preventing said inner member from rotating in said shells, said inner member including a detachable section projecting through the flanged openings of said sections and adapted to make driving connection with a second shaft, said detachable section being movable in a plane at substantial right angles to the plane of bodily movement of said spherical inner member, and a thrust ring connected to the flanges of said united sections.

In testimony whereof, I affix my signature.

JASPER N. MORRIS.